United States Patent
Hober et al.

(10) Patent No.: US 8,020,018 B2
(45) Date of Patent: Sep. 13, 2011

(54) CIRCUIT ARRANGEMENT AND METHOD OF OPERATING A CIRCUIT ARRANGEMENT

(75) Inventors: Peter Hober, Riemerling (DE); Knut Just, Unterschleissheim (DE)

(73) Assignee: Infineon Technologies AG, Neubiberg (DE)

( * ) Notice: Subject to any disclaimer, the term of this patent is extended or adjusted under 35 U.S.C. 154(b) by 750 days.

(21) Appl. No.: 11/861,287

(22) Filed: Sep. 26, 2007

(65) Prior Publication Data

US 2008/0079482 A1 Apr. 3, 2008

(30) Foreign Application Priority Data

Sep. 28, 2006 (DE) .................. 10 2006 045 911

(51) Int. Cl.
*G06F 1/00* (2006.01)
(52) U.S. Cl. ......... 713/324; 713/300; 713/320; 713/600
(58) Field of Classification Search .................. 713/300, 713/320, 324, 600
See application file for complete search history.

(56) References Cited

U.S. PATENT DOCUMENTS

| | | | | |
|---|---|---|---|---|
| 6,586,982 B2 * | 7/2003 | Furusawa et al. | ............. | 327/225 |
| 6,864,708 B2 * | 3/2005 | Takahashi et al. | ............. | 326/33 |
| 7,088,161 B2 * | 8/2006 | Furusawa et al. | ............. | 327/212 |
| 7,102,382 B2 * | 9/2006 | Drenth et al. | ............. | 326/38 |
| 7,109,771 B2 * | 9/2006 | Furusawa et al. | ............. | 327/212 |
| 7,155,630 B2 * | 12/2006 | Bell et al. | ............. | 713/600 |
| 7,323,909 B2 * | 1/2008 | Mamidipaka | ............. | 326/93 |
| 7,356,718 B2 * | 4/2008 | Menke et al. | ............. | 713/320 |
| 7,366,012 B2 * | 4/2008 | Perroni et al. | ............. | 365/185.01 |
| 7,376,039 B2 * | 5/2008 | Choi et al. | ............. | 365/228 |
| 7,430,673 B2 * | 9/2008 | Kardach et al. | ............. | 713/300 |
| 7,519,850 B2 * | 4/2009 | Bell et al. | ............. | 713/600 |
| 7,698,586 B2 * | 4/2010 | Kim et al. | ............. | 713/324 |
| 7,750,680 B2 * | 7/2010 | Mamidipaka | ............. | 326/93 |
| 2001/0052623 A1 * | 12/2001 | Kameyama et al. | ............. | 257/369 |
| 2002/0008999 A1 * | 1/2002 | Hidaka | ............. | 365/200 |
| 2003/0102898 A1 * | 6/2003 | Furusawa et al. | ............. | 327/225 |
| 2003/0132737 A1 | 7/2003 | Lin | | |
| 2003/0237010 A1 * | 12/2003 | Bell et al. | ............. | 713/320 |
| 2004/0071026 A1 * | 4/2004 | Hidaka | ............. | 365/200 |
| 2004/0083397 A1 | 4/2004 | Chen | | |
| 2004/0210781 A1 | 10/2004 | Ueda | | |
| 2004/0239397 A1 * | 12/2004 | Mudge et al. | ............. | 327/278 |
| 2005/0035802 A1 * | 2/2005 | Furusawa et al. | ............. | 327/198 |
| 2005/0035803 A1 * | 2/2005 | Furusawa et al. | ............. | 327/198 |
| 2005/0068059 A1 * | 3/2005 | Takahashi et al. | ............. | 326/16 |
| 2005/0179461 A1 * | 8/2005 | Menke et al. | ............. | 326/34 |
| 2005/0200382 A1 * | 9/2005 | Drenth et al. | ............. | 326/38 |
| 2005/0212560 A1 * | 9/2005 | Hidaka | ............. | 326/83 |
| 2006/0220717 A1 * | 10/2006 | Padhye et al. | ............. | 327/218 |
| 2006/0242440 A1 * | 10/2006 | Frederick et al. | ............. | 713/320 |
| 2006/0273838 A1 * | 12/2006 | Berthold et al. | ............. | 327/261 |

(Continued)

*Primary Examiner* — Thomas Lee
*Assistant Examiner* — Jaweed A Abbaszadeh
(74) *Attorney, Agent, or Firm* — Infineon Technologies; Philip H. Schlager

(57) ABSTRACT

A circuit arrangement is provided comprising a first partial circuit to receive a supply voltage, a second partial circuit to receive an output signal of the first partial circuit and a first clock signal, the second partial circuit to store the output signal of the first partial circuit depending on the first clock signal, and a control unit to decouple the supply voltage from the first partial circuit for a time period that is shorter than a cycle duration of the first clock signal, wherein the control unit is configured to receive a second clock signal which is derived from the first clock signal by delaying.

21 Claims, 14 Drawing Sheets

U.S. PATENT DOCUMENTS

| | | | |
|---|---|---|---|
| 2007/0001733 A1* | 1/2007 | Branch et al. | 327/218 |
| 2007/0022336 A1* | 1/2007 | Branch et al. | 714/724 |
| 2007/0022344 A1* | 1/2007 | Branch et al. | 714/731 |
| 2007/0063752 A1* | 3/2007 | Kowalczyk et al. | 327/202 |
| 2007/0103217 A1* | 5/2007 | Frederick et al. | 327/218 |
| 2007/0171731 A1* | 7/2007 | Ford et al. | 365/189.01 |

\* cited by examiner

# CIRCUIT ARRANGEMENT AND METHOD OF OPERATING A CIRCUIT ARRANGEMENT

REFERENCE TO RELATED APPLICATIONS

This application claims priority to German Patent Application No. 10 2006 045 911.3, filed on Sep. 28, 2006. The entire contents of the German Patent Application are hereby incorporated herein by reference.

BACKGROUND

Primarily for an integrated semiconductor circuit with limited power supply, like e.g. for a usage in a battery-powered terminal equipment, it is desirable to spend a small electrical power dissipation for optimization of durability and extension of the operating time, respectively. Therefore, a so called stand-by mode is usually provided for such integrated semiconductor circuits in which essential parts and circuit areas of the integrated semiconductor circuit, respectively, are completely switched off or are operated at a reduced operating frequency, i.e. at an extended system clock. On demand, the integrated semiconductor circuit that has been put into the stand-by mode is switched over to an active mode at short notice.

Particularly for integrated semiconductor circuits that are operated for a long time or predominantly in the stand-by mode, the power consumption in this mode matters significantly. Provided that such a circuit is operated at a reduced operating frequency, the power consumption in the stand-by mode is principally dominated by leakage currents of individual switch- and storage elements (cells).

BRIEF DESCRIPTION OF THE DRAWINGS

The detailed description is described with reference to the accompanying figures. The use of the same reference numbers in different figures indicates similar or identical items.

DETAILED DESCRIPTION

Figure 1:
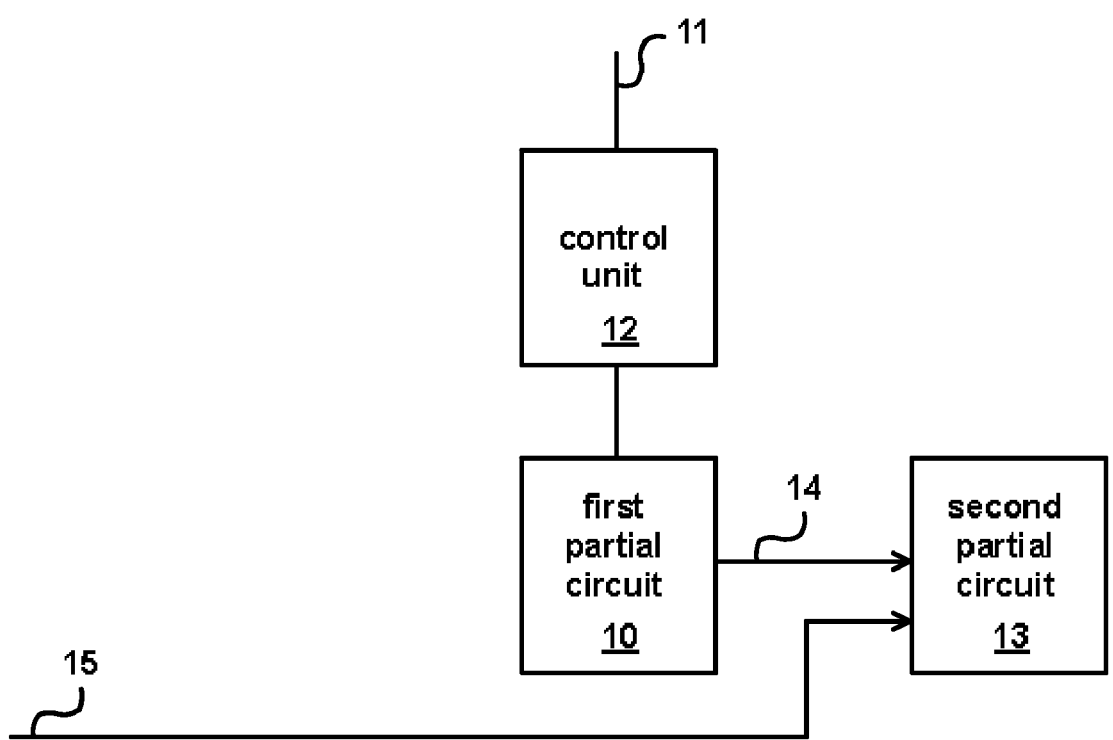
FIG. 1 illustrates a schematic diagram of a circuit arrangement.

FIG. 1 illustrates a schematic diagram of a circuit arrangement in accordance with one implementation described herein. The circuit arrangement includes a first partial circuit 10 that is connected to a supply voltage 11 via a control unit 12. An output signal 14 of the first partial circuit 10 is connected to a second partial circuit 13. Besides the output signal 14, the second partial circuit 13 receives a first clock signal 15. The second partial circuit 13 stores the value of the output signal 14 depending on the first clock signal 15. The control unit 12 may decouple the supply voltage 11 from the first partial circuit 10 for a time period that is shorter than a cycle duration of the first clock signal 15. By the decoupling, the connection between the supply voltage 11 and all the transistors the first partial circuit 10 is designed with gets separated. Thus, the connection of the transistors to the supply voltage 11 gets interrupted. Accordingly, in the first partial circuit 10 leakage currents may not flow during the whole clock cycle but just during a predetermined time period within a clock cycle. The leakage current consumption and the power dissipation of the first partial circuit 10 and of the whole circuit arrangement may be reduced by temporarily switching-off the supply voltage 11. A state of the output signal 14 may not get lost by the switching-off of the supply voltage 11 but may be stored in the second partial circuit 13. A supply voltage of the second partial circuit 13 may be continuously coupled with the second partial circuit 13.

The first partial circuit 10 may be designed for a high frequency fmax of e.g. 50 MHz and may be operated at a low frequency of e.g. 32 kHz. Therefore, the first partial circuit 10 may be decoupled from the supply voltage 11 for a relatively long time period without influencing the functionality of the circuit arrangement. At the switching-on and switching-off of the supply voltage 11, charging currents may flow that may be caused by charging and discharging of signal potentials of the first partial circuit 10. When the supply voltage 11 is switched on, leakage currents may flow through the transistors the first partial circuit 10 is designed with. At a slow clock frequency, a portion of the power dissipation that may be caused by the charging currents may be lower than a portion of power dissipation that may be caused by leakage currents. In other words, at a slow clock frequency, the power consumption of the first partial circuit 10 may be reduced by temporarily switching off the supply voltage 11.

Figure 2:
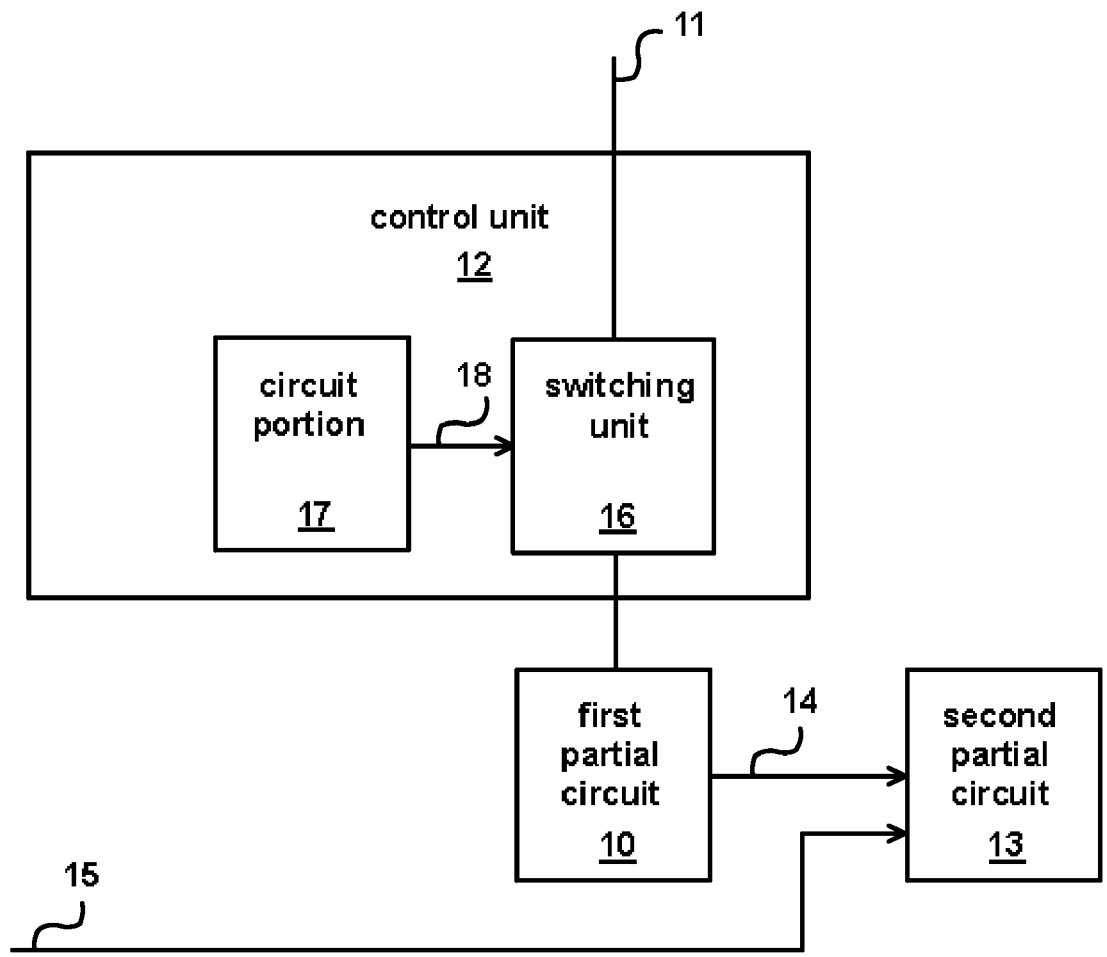
FIG. 2 illustrates a schematic diagram of a circuit arrangement in accordance with a further implementation.

FIG. 2 illustrates a schematic diagram of a circuit arrangement in accordance with a further implementation described herein. FIG. 2 shows an embodiment of the control unit 12. The control unit 12 includes a switching unit 16 that may be controlled by a circuit portion 17 via a control signal 18. The switching of the supply voltage 11 may take place in the switching unit 16 depending on the control signal 18.

The switching unit 16 may be a transistor. The transistor provides an easy possibility of coupling or decoupling the supply voltage 11 with or from the first partial circuit 10. The transistor has three terminals. A first and second terminal corresponds to an emitter or collector terminal of a bipolar transistor and to a source or drain terminal of a field effect transistor, respectively. A third terminal corresponds to a basis terminal of a bipolar transistor and to a gate terminal of a field effect transistor, respectively. The first terminal may be connected to the supply voltage 11, the second terminal may be connected to the first partial circuit 10 and the third terminal may be connected to the control signal 18. The transistor may establish a connection between the supply voltage 11 and the first partial circuit 10 depending on the control signal 18. The switching circuit 16 may include a plurality of transistors that may be connected in parallel. The number of transistors connected in parallel may be adapted to the current consumption of the first partial circuit 10. That means, the higher the current consumption of the first partial circuit 10 the higher may be the number of transistors that are employed for switching the supply voltage 11. The circuit portion 17 may switch all transistors simultaneously. Alternatively, the transistors may switch successively. Thereby, the third terminal of a transistor may be connected to an output of a delay element. The delay elements may switch each transistor at a different point in time. Alternatively, several transistors may form a group and may be connected to a common delay element. The group of transistors may switch at the same point in time. At the switching-on of the supply voltage 11, the maximum change of the switching-on current over time may be limited by the chronology of the switching of the transistors. Consequently, an oversized voltage drop may be prevented in feed lines of the supply voltage 11.

For the implementations illustrated and described in connection with FIG. 2, FIG. 3, FIG. 4 and FIG. 5 are exemplary illustrations of signal waveforms of the control signal 18 for a period of a clock cycle T1 of the first clock signal 15. The switching unit 16 may connect the supply voltage 11 to the first partial circuit 10 when the control signal 18 has the value of a logic '1'.

Figure 3:
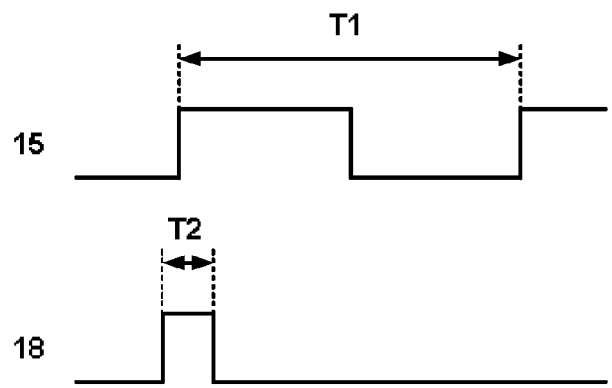
FIG. 3 is an exemplary illustration of signal waveforms for the implementation illustrated and described in connection with FIG. 2.
Figure 4:
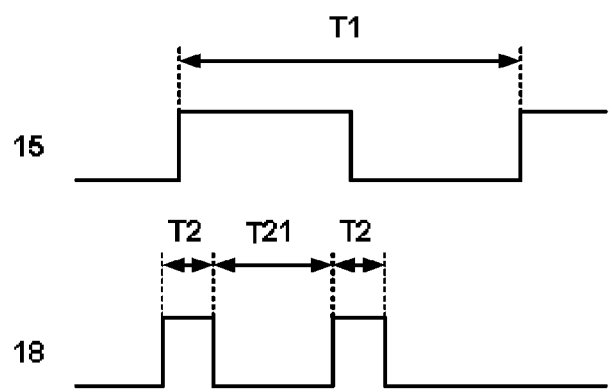
FIG. 4 is a further exemplary illustration of signal waveforms for the implementation illustrated and described in connection with FIG. 2.

In FIG. 3 and in FIG. 4 the first clock signal 15 has a symmetrical duty cycle. In FIG. 3, during the rising clock edge, the first partial circuit 10 is connected to the supply voltage 11 merely for a time period T2. During the remaining time, the supply voltage 11 is decoupled from the first partial circuit 10. During this time, there may not arise any power dissipation caused by leakage currents in the first partial circuit 10. The second partial circuit 13 may take over and store the value of an output of the first partial circuit 10 at the rising clock edge. Therefore, the functionality of the circuit arrangement may not be influenced by the temporarily switching-off of the supply voltage 11.

Whereas in FIG. 3 the coupling and decoupling of the supply voltage 11 with and from the first partial circuit 10 takes place just once within a clock cycle, in FIG. 4 the first partial circuit 10 gets connected and separated to and from the supply voltage 11 twice within a clock cycle. The supply voltage 11 is connected to the first partial circuit 10 for a time period T2 during the rising clock edge as well as the supply voltage 11 is connected to the first partial circuit 10 for a time period T2 during the falling clock edge. Between the rising and the falling clock edge, the supply voltage 11 is decoupled from the first partial circuit 10 for a time period T21, wherein 2*T2+2*T21 corresponds to the cycle duration T1. Thus, the first partial circuit 10 may provide a stable value at an output at the rising clock edge as well as at the falling clock edge. The second partial circuit 13 may take over and store this output at both clock edges. The second partial circuit 13 may include storage elements that may be triggered by the rising clock edge as well as storage elements that may be triggered by the falling clock edge.

In the signal waveform illustrated in FIG. 4, the control signal 18 assumes the value of a logic '1' twice, each for a time period T2, within a cycle duration T1. That means that both time periods for which the first partial circuit 10 is connected to the supply voltage 11 have equal lengths. Alternatively, the time periods for which the first partial circuit 10 is connected to the supply voltage 11 may have different lengths.

Figure 5:
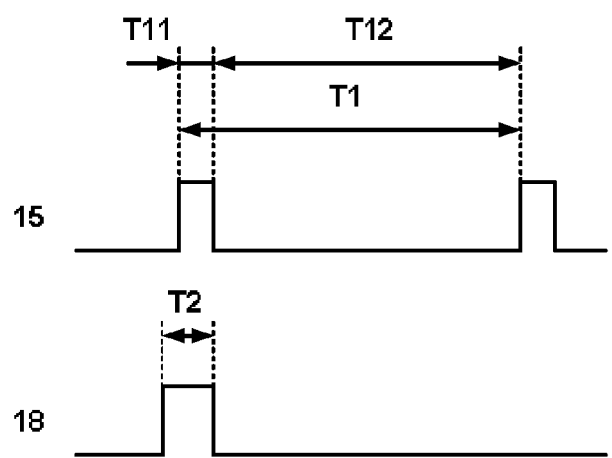
FIG. 5 is a further exemplary illustration of signal waveforms for the implementation illustrated and described in connection with FIG. 2.

In the signal waveforms illustrated in FIG. 5, the first clock signal 15 has an asymmetrical duty cycle. A time interval T11 during which the first clock signal 15 assumes the value of a logic '1' is much shorter than a time interval T12 during which the first clock signal 15 assumes the value of a logic '0'. The control signal 18 establishes just once within the cycle duration T1 a connection between the supply voltage 11 and the first partial circuit 10 while the control signal 18 assumes the value of a logic '1' during the time interval T2. The time interval T2 is longer than the time interval T11 and the control signal 18 has the value of a logic '1' during the whole time interval in which the first clock signal 15 has the value of a logic '1'. Consequently, the first partial circuit 10 may be connected to the supply voltage 11 at the rising clock edge as well as at the falling clock edge and may provide a stable value at its output. Similar to the signal waveform illustrated in FIG. 4, the second partial circuit 13 may take over the value at the output of the first partial circuit 10 at both clock edges. In contrast to the signal waveform illustrated in FIG. 4, just one switching-on procedure is required. Therefore, the power dissipation caused by the switching-on procedure of supply voltage 11 is lower than for the signal waveform illustrated in FIG. 4.

Figure 6:
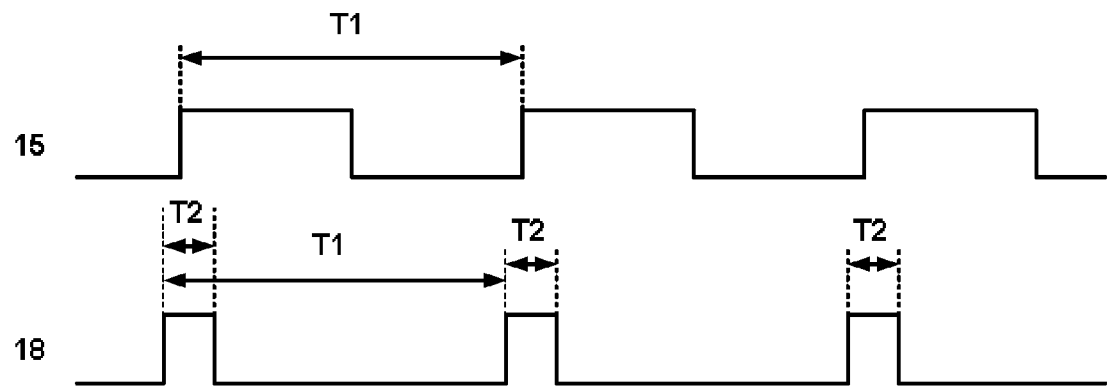
FIG. 6 is a further exemplary illustration of signal waveforms for the implementation illustrated and described in connection with FIG. 2.

For the implementation illustrated and described in connection with FIG. 2, FIG. 6 shows an exemplary illustration of a signal waveform of the control signal 18 for the periods of various clock cycles. The supply voltage 11 is periodically switched on and switched off and thereby, the supply voltage 11 is connected to the first partial circuit 10 in each clock cycle for a time period T2. As described for FIG. 3, the supply voltage 11 may be connected to the first partial circuit 10 during the rising clock edge. In alternative implementations, the signal waveforms illustrated and described in FIG. 4 and FIG. 5 may be repeated periodically in each clock cycle.

Figure 7:
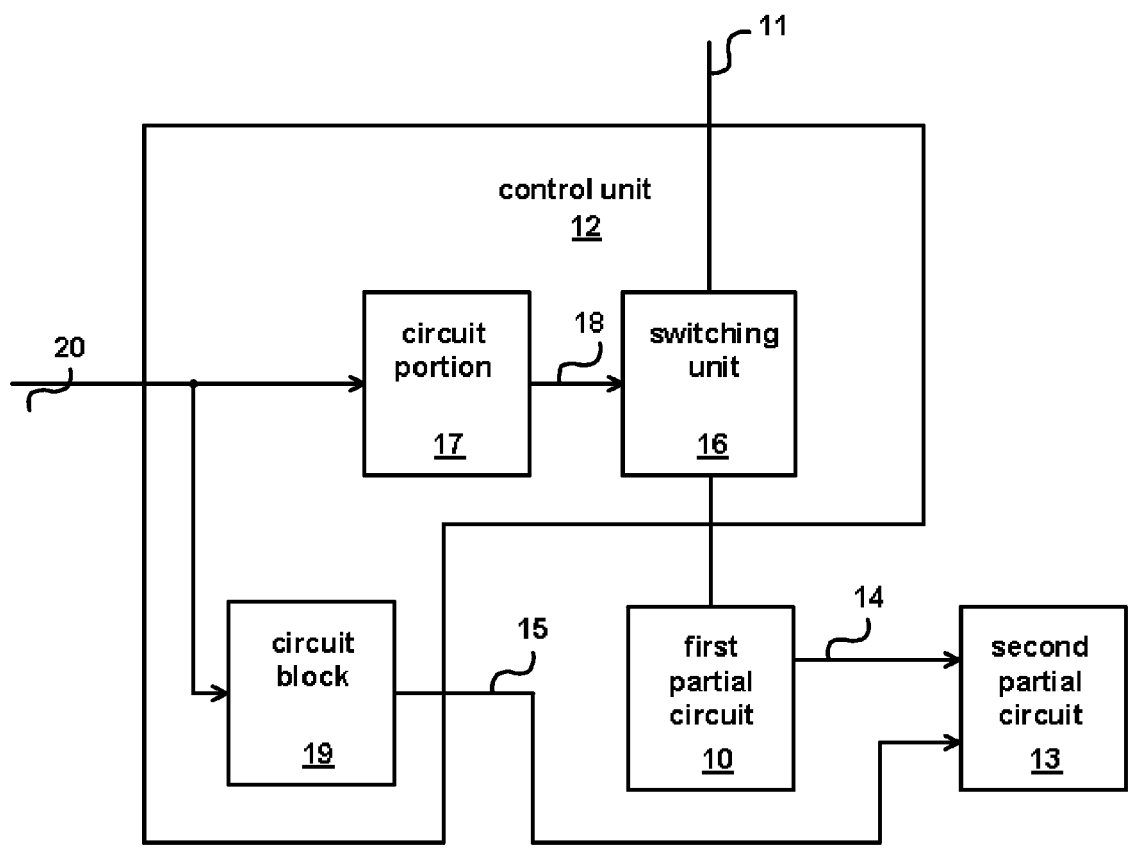
FIG. 7 illustrates a schematic diagram of a circuit arrangement in accordance with a further implementation.

FIG. 7 illustrates a schematic diagram of a circuit arrangement in accordance with a further implementation described herein. In comparison with the implementation illustrated and described in FIG. 2, the control unit 12 includes an additional circuit block 19. A second clock signal 20 may be applied to an input of the circuit block 19 and the first clock signal 15 may be provided at an output of the circuit block 19. The circuit block 19 may generate the first clock signal 15 from the second clock signal 19. The second clock signal 20 may control the switching of the supply voltage 11 of the first partial circuit 10 and the first clock signal 15 may control the storage of the output signal 14 in the second partial circuit 13. By the circuit block 19, it may be achieved that the first partial circuit 10 may be supply with voltage before the second partial circuit 13 stores the value of the output signal 14 of the first partial circuit 10.

In one implementation, the first clock signal 15 is formed by delaying the second clock signal 19 in the circuit block 19. An edge of the second clock signal 19 may trigger the point in time when the supply voltage 11 is connected to the first partial circuit 10. The corresponding edge of the first clock signal 15 may take place temporally delayed to the edge of the second clock signal 20. A value of the output 14 of the first partial circuit 10 may be stored in the second partial circuit 13 with this delayed edge of the first clock signal 15. Thus, the supply voltage 11 may be coupled with the first partial circuit 10 before the value of the output 14 of the first partial circuit 10 may be stored in the second partial circuit 13. By deriving the first clock signal 15 from the second clock signal 20 within the circuit arrangement, no additional pin of the circuit arrangement is allocated by an extra clock.

Figure 8:
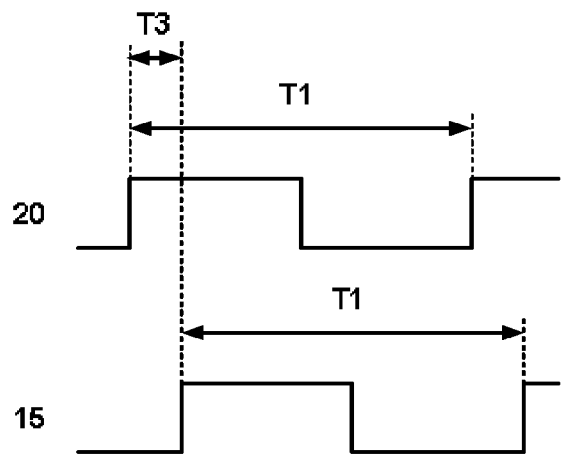
FIG. 8 is an exemplary illustration of signal waveforms for the implementation illustrated and described in connection with FIG. 7.
Figure 9:
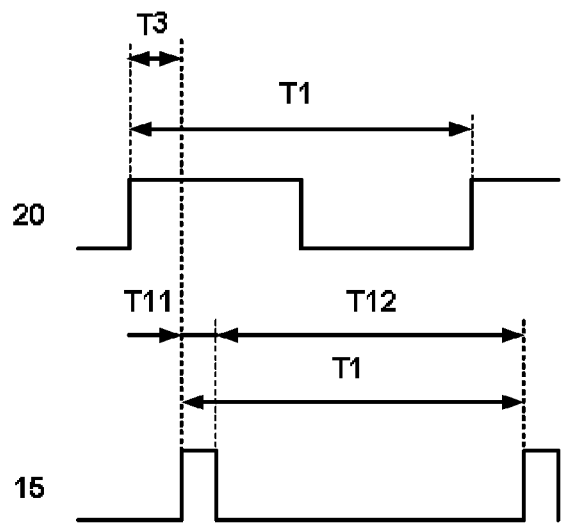
FIG. 9 is a further exemplary illustration of signal waveforms for the implementation illustrated and described in connection with FIG. 7.

For the implementation illustrated and described in connection with FIG. 7, FIG. 8 and FIG. 9 show exemplary illustrations of signal waveforms of the first clock signal 15 and of the second clock signal 20. In FIG. 8 as well as in FIG. 9, the second clock signal 20 has a symmetrical duty cycle and a cycle duration T1. In FIG. 8, the first clock signal 15 is derived from the second clock cycle 20 by purely delaying for a time period T3. In contrast to that, in FIG. 9 a change in the duty cycle takes place in addition to the delay. The first clock 15 has an asymmetrical duty cycle, wherein the duration of the '1' level phase is shorter than the duration of the '0' level phase.

By scaling the time period of the delay and/or the duty cycle, the circuit arrangement may be adapted to its specific parameters. The specific parameters may the technology in which the circuit arrangement is implemented, the frequency of the first clock signal 15 or the second clock signal 20, or the depth of the logic of the first partial circuit 10 and the signal propagation time of the first partial circuit 10, respectively. The signal propagation time of the first partial circuit 10 corresponds to the reciprocal of the high frequency fmax for which the first partial circuit 10 is designed.

Alternatively to the implementation illustrated and described in connection with FIG. 7, the first clock signal 15 and the second clock signal 20 may be applied to the circuit arrangement from outside, e.g. via pins. In a further implementation, both clock signals may be generated in a circuit that is part of the circuit arrangement and that is situated outside the control unit 12, the first partial circuit 10 or the second partial circuit 13.

Figure 10:
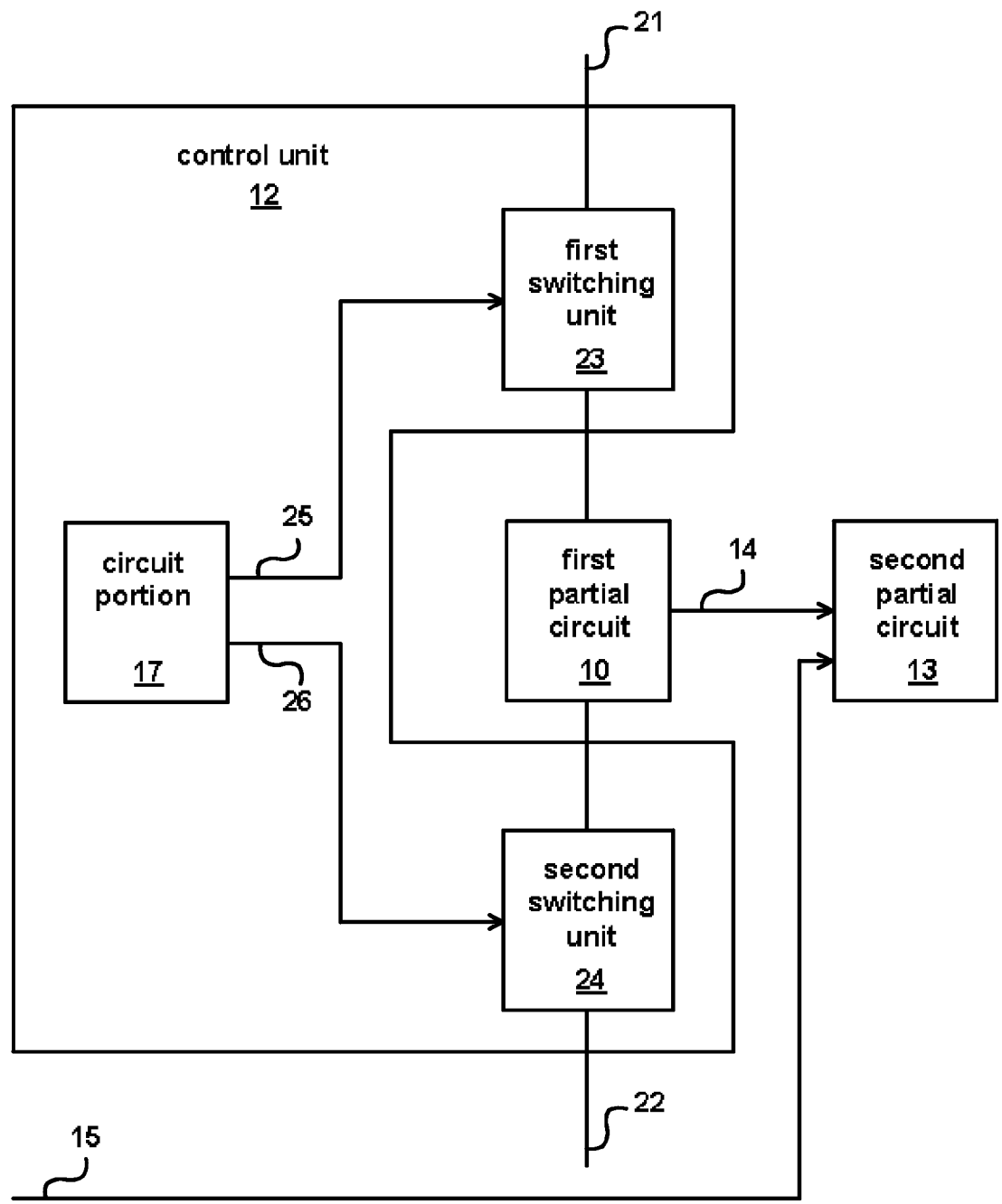
FIG. 10 illustrates a schematic diagram of a circuit arrangement in accordance with a further implementation.

FIG. 10 illustrates a schematic diagram of a circuit arrangement in accordance with a further implementation described herein. The supply voltage 11 includes a first supply voltage line 21 with a first supply voltage potential and a second supply voltage line 22 with a reference potential. The control unit 12 includes a first switching unit 23 and a second switching unit 24 to establish or to separate a connection between the supply voltage lines 21, 22 and the first partial circuit 10. The first switching unit 23 is coupled between the first supply voltage line 21 and a first supply voltage input of the first partial circuit 10. The second switching unit 24 is coupled between the second supply voltage line 22 and a second supply voltage input of the first partial circuit 10. The switching units 23, 24 may be controlled depending on the control signals 25, 26 that may be provided by the circuit portion 17.

In the implementation illustrated and described in connection with FIG. 10 two switching units 23, 24 are provided. In an alternative implementation, just one switching unit 23, 24 may be provided that may be coupled between a supply voltage line 21, 22 and a supply voltage input of the first partial circuit 10. The other supply voltage input of the first partial circuit 10 may be permanently connected to the other supply voltage line 21, 22.

As was discussed earlier herein, the switching unit 23, 24 may include one transistor. Alternatively the switching unit 23, 24 may include a plurality of transistors that may be controlled simultaneously or successively. If the switching unit 23, 24 is situated on the same semiconductor circuit as the first partial circuit 10, the supply voltage potential to be switched may be a ground potential VSS. For switching of the ground potential VSS, a transistor of an NMOS or NFET conductivity type, e.g. an NMOS transistor, may be employed. A transistor of an NMOS or NFET conductivity type may require less area and less leakage current consumption than a transistor of a PMOS or PFET conductivity type.

Figure 11:
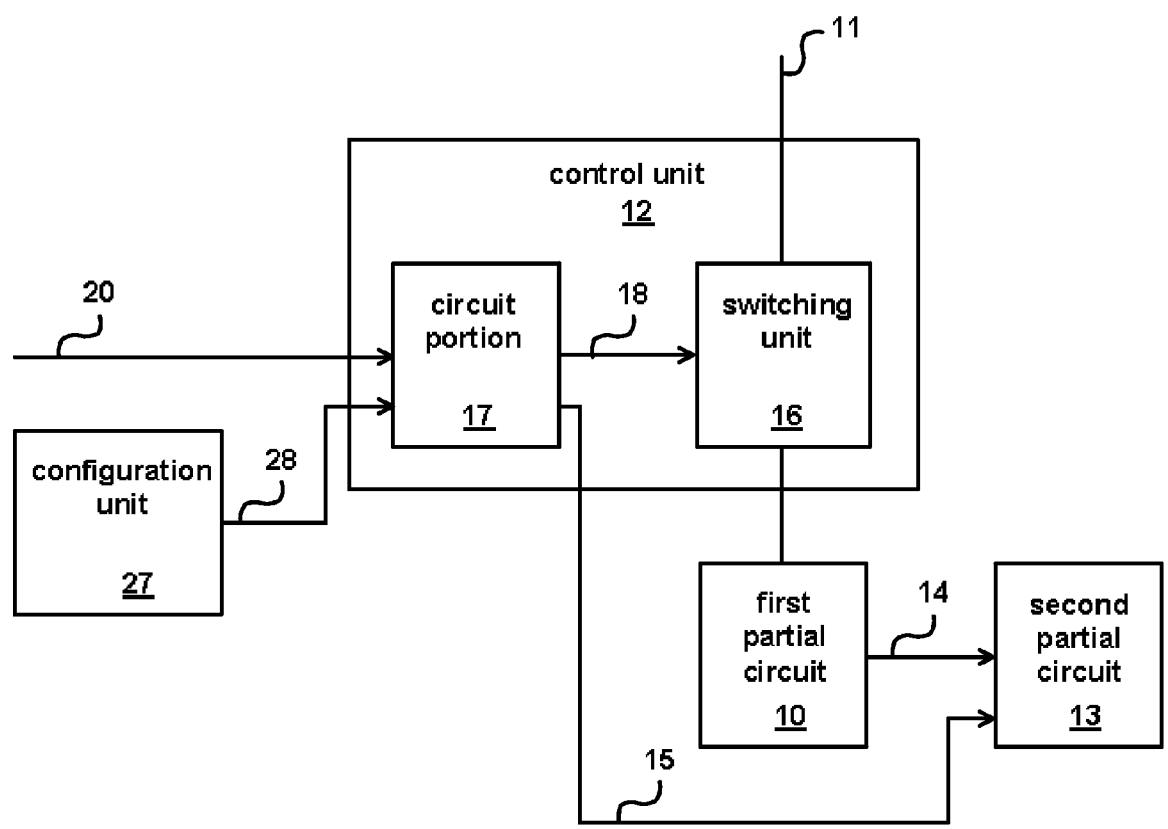
FIG. 11 illustrates a schematic diagram of a circuit arrangement in accordance with a further implementation.

FIG. 11 illustrates a schematic diagram of a circuit arrangement in accordance with a further implementation described herein. In addition to the implementation illustrated and described in connection with FIG. 2, the circuit arrangement of FIG. 11 includes a configuration unit 27. At an output of the configuration unit 27, a signal 28 may be provided that denotes an operating mode of the circuit arrangement. The operating mode signal 28 may be connected to an input of the circuit portion 17. The second clock signal 20 may be applied to a further input of the circuit portion 17. Depending on the operating mode signal 28, the circuit portion 17 may release the first clock signal 15 or the second clock signal 20 at an output. Further, the control signal 18 may be provided at an output of the circuit portion 17 and may control the switching unit 16 depending on the operating mode signal 28. The switching unit 16 may switch the connection between the supply voltage 11 and the first partial circuit 10.

The operating mode signal 28 may be used to flexibly adjust the clock signals of the circuit arrangement to variable requirements. In one implementation, a fast data processing speed of the circuit arrangement may be required in a first operating mode. This mode may be referred to as fast mode. In contrast to that, in a second operating mode there may be low data processing speed requirements. This mode may be referred to as slow mode. In the second operating mode low current consumption and low power dissipation of the circuit arrangement may be required. In the fast mode, the circuit portion 17 may directly couple the input to which the second clock signal 20 is applied with the output at which the first clock signal 15 is released. That means, the clock input of the second partial circuit 13 may be directly coupled with the second clock signal 20. In the fast mode, the frequency of the second clock signal 20 may be 26 MHz. Further, in the fast mode, the first partial circuit 10 may be permanently connected to the supply voltage 11.

In the slow mode, the circuit may behave as illustrated and described in connection with FIG. 1 to FIG. 10. In the slow mode, the frequency of the second clock signal 20 may be 32 kHz.

The implementation illustrated and described in connection with FIG. 11 may be implemented in a mobile telephone device. In the fast mode, the circuit arrangement may perform voice processing or picture editing that may require a high data throughput and a high data processing speed. The slow mode may be a stand-by mode in which the circuit arrangement may wait for a wakeup signal, e.g. for a key press on a keyboard. In the stand-by mode, the circuit arrangement may be operated at a low clock frequency. As a mobile telephone device is most of the time in the stand-by mode, low power consumption is required in this mode.

Figure 12:
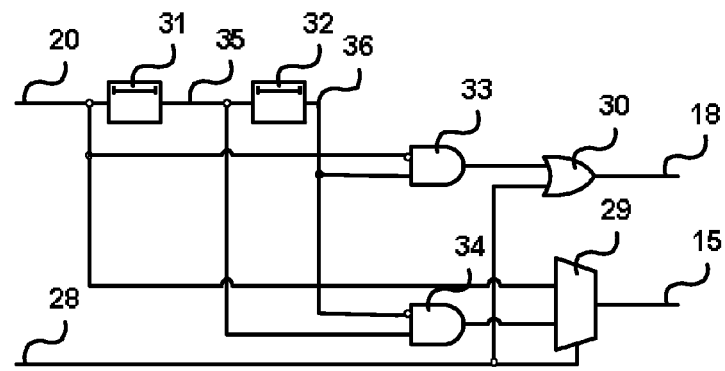
FIG. 12 illustrates an exemplary implementation of a circuit portion illustrated and described in connection with FIG. 11.
Figure 14:
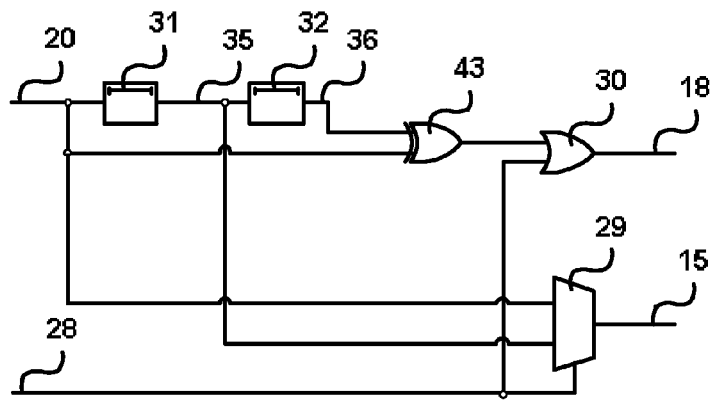
FIG. 14 illustrates a further exemplary implementation of a circuit portion illustrated and described in connection with FIG. 11.

For the implementations illustrated and described in connection with FIG. 11, FIG. 12 and FIG. 14 show two exemplary implementations of the circuit portion 17. In both implementations, the second clock signal 20 and the operating mode signal 28 are applied to inputs of the circuit portion 17. In the illustrated implementations, the signal 28 has the value of a logic '1' in the fast mode and the value of a logic '0' in the slow mode. At an output of the circuit portion 17, the first clock signal 15 and the control signal 18 are released. If the control signal 18 has the value of a logic '1', the first partial circuit 10 is connected to the supply voltage 11.

In the fast mode, the implementations of FIG. 12 and FIG. 14 may behave equally. The circuit portion 17 includes a multiplexer 29 that connects through the second clock signal 20 to the output of the first clock signal 15. Further, the control portion 17 includes an OR-gate 30 that effects that the control signal 18 permanently has the value of a logic '1' in the fast mode. Thus, the multiplexer 29 and the OR-gate 30 effect that the first partial circuit 10 is permanently connected to the supply voltage 11 and the second partial circuit 13 is coupled with the second clock signal 20 in the fast mode.

Figure 13:
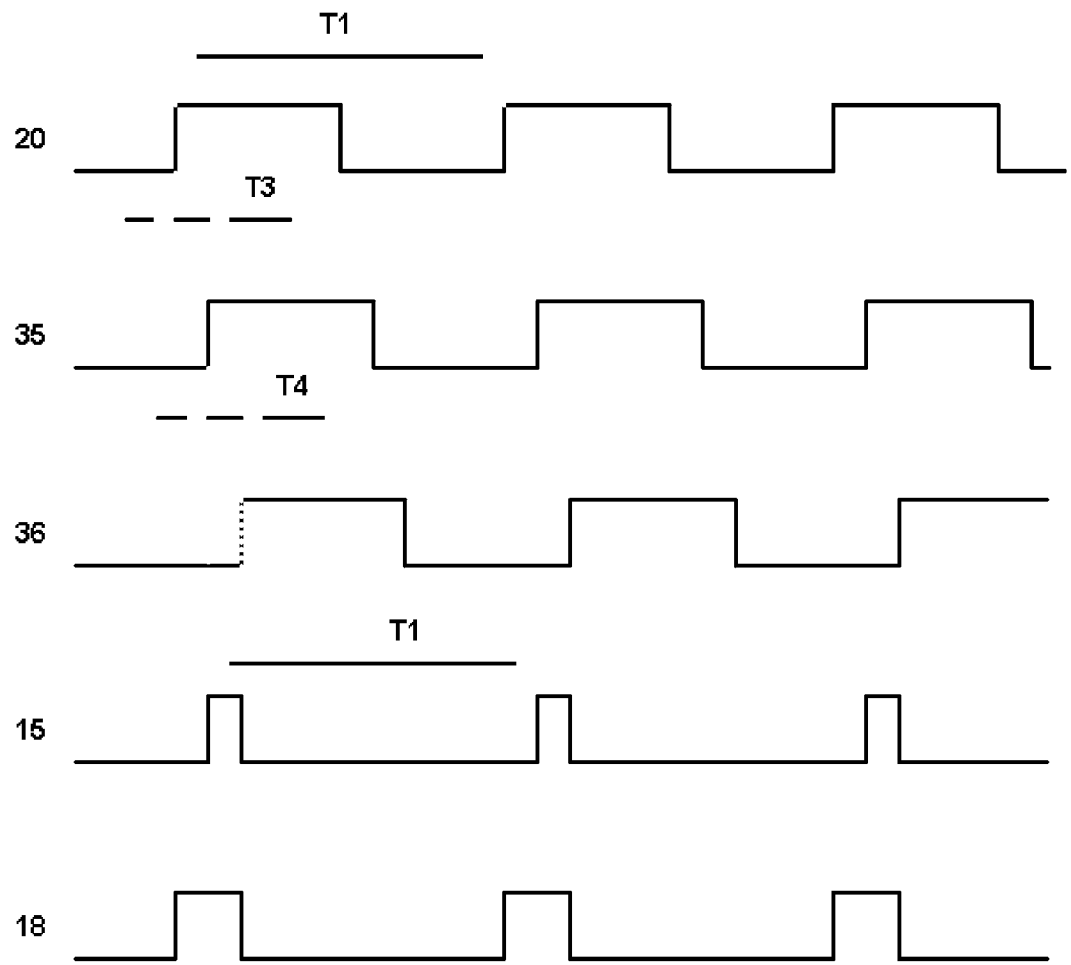
FIG. 13 is an exemplary illustration of signal waveforms for the implementation illustrated and described in connection with FIG. 12.
Figure 15:
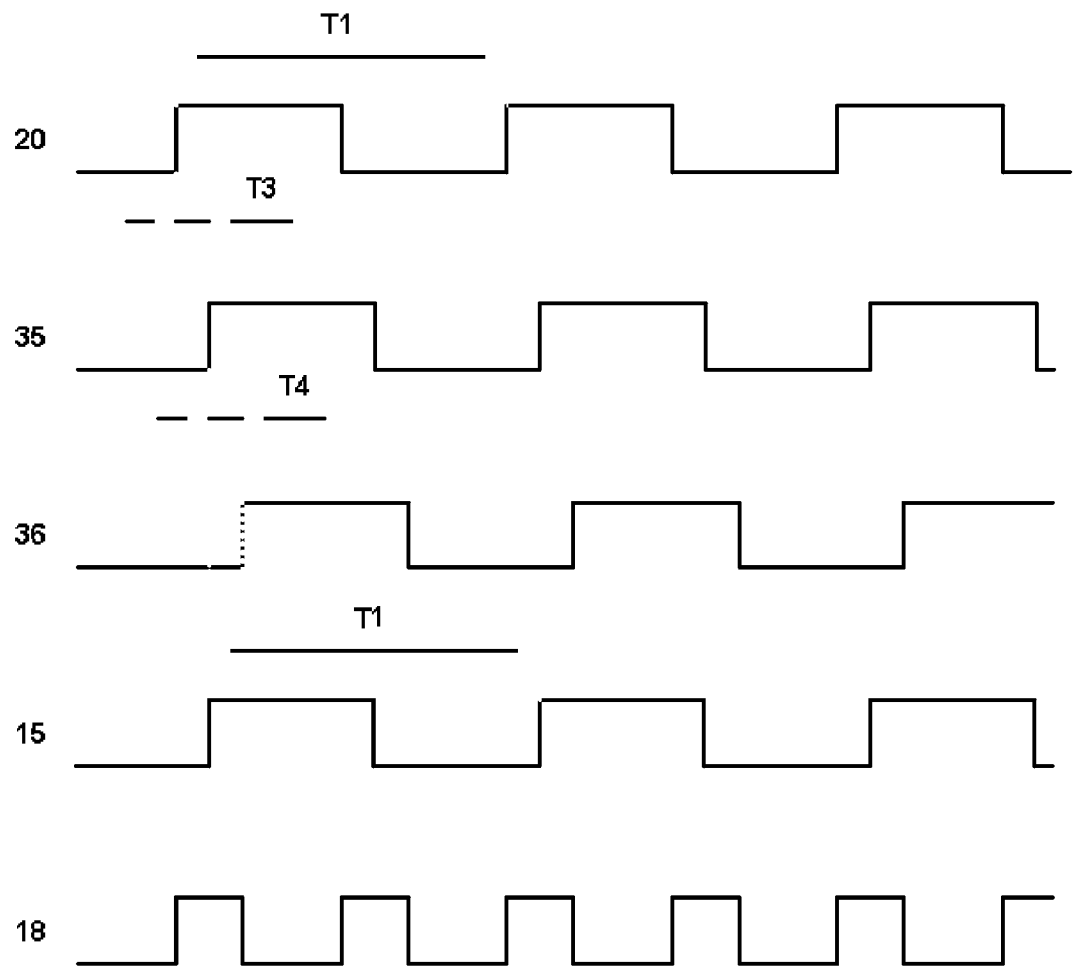
FIG. 15 is an exemplary illustration of signal waveforms for the implementation illustrated and described in connection with FIG. 14.

For the implementation illustrated and described in connection with FIG. 12, FIG. 13 shows an exemplary illustration of signal waveforms in the slow mode. For the implementation illustrated and described in connection with FIG. 14, FIG. 15 shows an exemplary illustration of signal waveforms in the slow mode. At the implementation illustrated in FIG. 12, the control signal 18 assumes the value of a logic '1' with every rising edge of the second clock signal 20. The circuit portion 17 includes two delay elements 31, 32 that are connected in series and that delay the signal at its input by a time T3 and T4, respectively. The delay elements 31, 32 together with an AND-gate 33 effect that the control signal 18 assumes again the value of a logic '0' after the time T3+T4. The AND-gate 33 has an inverted input and the AND-gate 33 effects that the supply voltage 11 is connected to the first partial circuit 10 for the time T3+T4 at every rising clock edge of the second clock signal 20. Also the first clock signal 15 assumes the value of a logic '1' with every rising edge of the second clock signal 20. The delay element 32 together with an AND-gate 34 that has an inverted input, too, effect that the time period of the logic '1' level corresponds to the time interval T4. Consequently, the first clock signal 15 and the second clock signal 20 have different duty cycles.

At the implementation illustrated in FIG. 14, the control signal 18 assumes the value of a logic '0' with every rising and falling edge of the second clock cycle 20. The circuit portion 17 includes two delay elements 31, 32 that are connected in series and that delay the signal at its input by the time T3 and T4, respectively. The delay elements 31 and 32 together with an XOR-gate 43 effect that the control signal 18 assumes again the value of a logic '0' after the time T3+T4. At the implementation illustrated in FIG. 14, in the slow mode at every clock edge of the second clock signal 20 the supply voltage 11 gets connected to the first partial circuit 10 for the time period T3+T4. Thus, at every edge of the first clock signal 15, the first partial circuit 10 is connected to the supply voltage 11. The first clock signal 15 is derived from the second clock cycle 20 by pure delaying for the time period T3. Consequently, the first clock signal 15 and the second clock signal 20 have identical duty cycles.

In one implementation of the circuit arrangement, the first partial circuit 10 and the second partial circuit 13 are designed with transistors with low threshold voltage, so called low VT transistors. The low threshold voltage may effect that the low VT transistors have a high switching speed. In contrast to that, the switching unit 16, 23, 24 is designed with transistors with high threshold voltage, so called high VT transistors. These transistors may have a lower leakage current consumption than low VT transistors. The usage of low VT transistors in both partial circuits 10, 13 may lead to a high processing speed of the circuit arrangement. The usage of high VT transistors in the switching unit 16, 23, 24 may lead to a low leakage current consumption of the circuit arrangement when the supply voltage 11, 21, 22 is separated from the first partial circuit 10.

In one implementation the first partial circuit 10 includes just combinational logic. When decoupling the supply voltage 11, 21, 22 from the first partial circuit 10 all nodes of the first partial circuit 10 get discharged. When coupling the supply voltage 11, 21, 22 with the first partial circuit 10 all nodes of the first partial circuit 10 get charged and an output signal of the first partial circuit 10 is unambiguously defined by the input signals of the first partial circuit 10. Thus, after switching-off of the supply voltage 11, 21, 22, all nodes of the first partial circuit 10 may be charged again by connecting the supply voltage 11, 21, 22 to the first partial circuit 10.

In one implementation the second partial circuit 13 includes at least one storage element. The storage element may be a flip-flop or a memory, e.g. an SRAM. The storage element may store an output signal of the first partial circuit 10 triggered by an edge of the first clock signal 10. Thus, the value of the output signal may be available even after the supply voltage 11 has been decoupled from the first partial circuit 10.

In one implementation the circuit arrangement is an integrated semiconductor circuit. In a further implementation, the circuit arrangement is arranged in several semiconductor circuits. In a further implementation, the circuit arrangement is fully or partly designed with discrete components.

Figure 16:
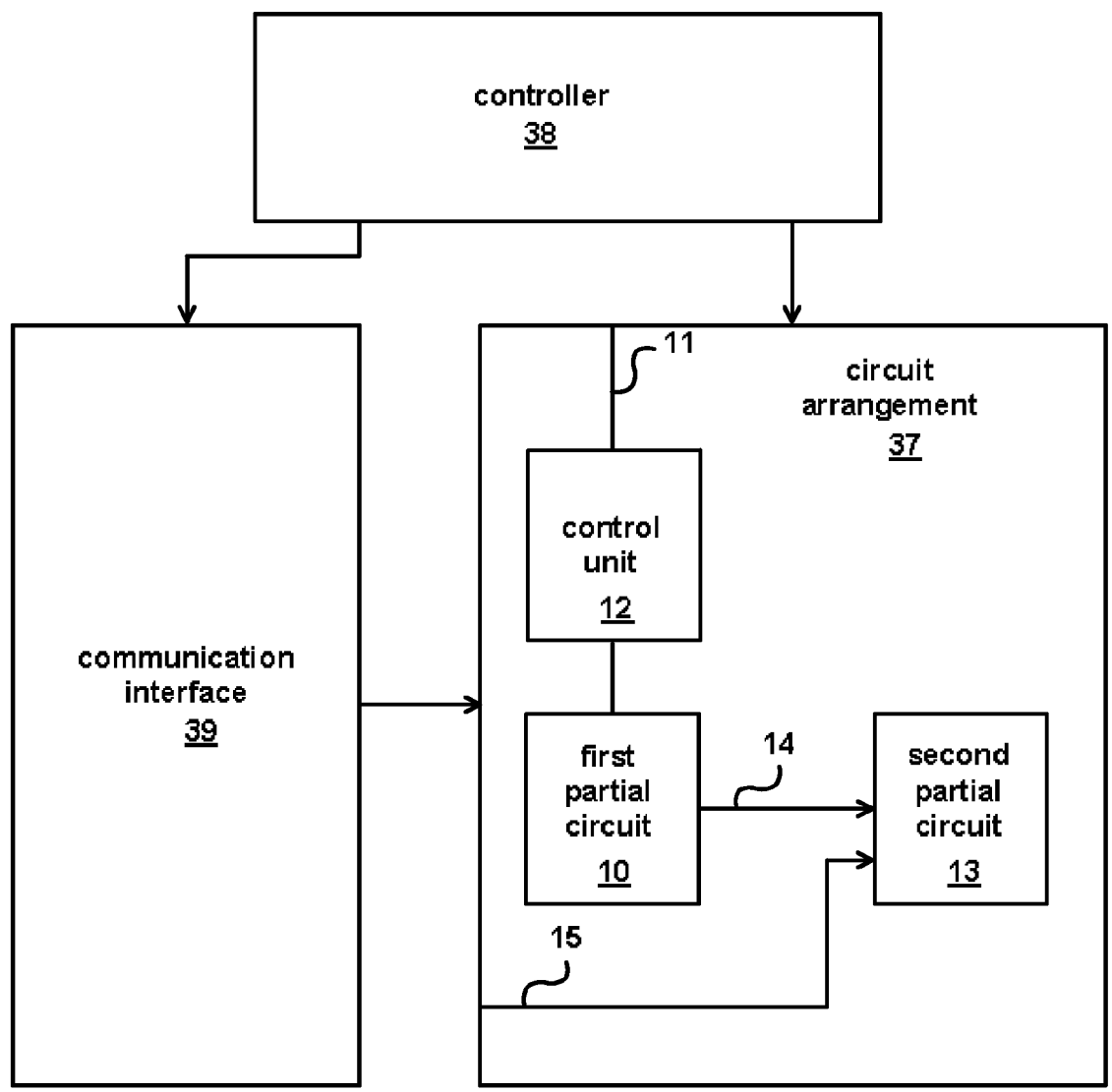
FIG. 16 illustrates a schematic diagram of a system that includes a circuit arrangement, a controller and a communication interface.

FIG. 16 illustrates a schematic diagram of a system that includes a circuit arrangement 37, a controller 38 and a communication interface 39. The circuit arrangement 37 includes a first partial circuit 10 that is connected to a supply voltage 11 via a control unit 12. An output signal 14 of the first partial circuit 10 is connected to a second partial circuit 13. Besides the output signal 14, the second partial circuit 13 receives a first clock signal 15. The second partial circuit 13 stores the value of the output signal 14 depending on the first clock signal 15. The control unit 12 may decouple the supply voltage 11 from the first partial circuit 10 for a time period that is shorter than a cycle duration of the first clock signal 15.

The communication interface 39 may transfer data to the circuit arrangement 37 and the data may be processed in the circuit arrangement 37. The data processing may take place partly or completely in the first partial circuit 10 and the processed data may be stored and buffered, respectively, in the second partial circuit 13. The data transfer from the communication interface 39 to the circuit arrangement 37 may be controlled by the controller 38. In a microprocessor system, the communication interface 39 may be connected to a microcontroller and the controller 38 may be part of the microcontroller. The communication interface 39 may be a user interface that may be realized as a keyboard or as a touch-screen terminal of a personal computer or of a mobile telephone.

Figure 17:
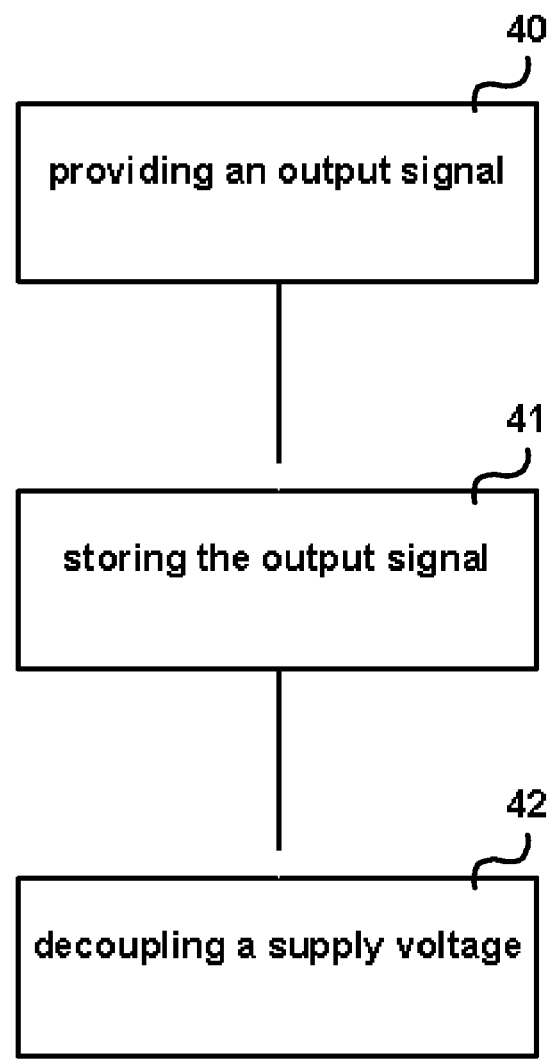
FIG. 17 illustrates a flow diagram that includes a number of operations for operating a circuit arrangement.

FIG. 17 illustrates a flow diagram that includes a number of operations for operating a circuit arrangement. At block 40, an output signal of a first partial circuit is applied to a second partial circuit. At block 41, the output signal is stored in the second partial circuit. At block 42, a supply voltage of the first partial circuit is decoupled from the first partial circuit for a time period that is shorter than a cycle duration of the first clock signal.

The supply voltage may be decoupled from the first partial circuit at least twice within the period of a clock cycle. A second clock signal may be applied to the circuit arrangement. For generating the first clock signal, the second clock signal may be delayed. Alternatively or additionally, the duty cycle of the first clock signal may be changed. The supply voltage may get coupled with the first partial circuit between an edge of the second clock signal and the delayed edge of the first clock signal. An operating mode may be set and the supply voltage may be coupled with the first partial circuit depending on the operating mode.

Figure 18:
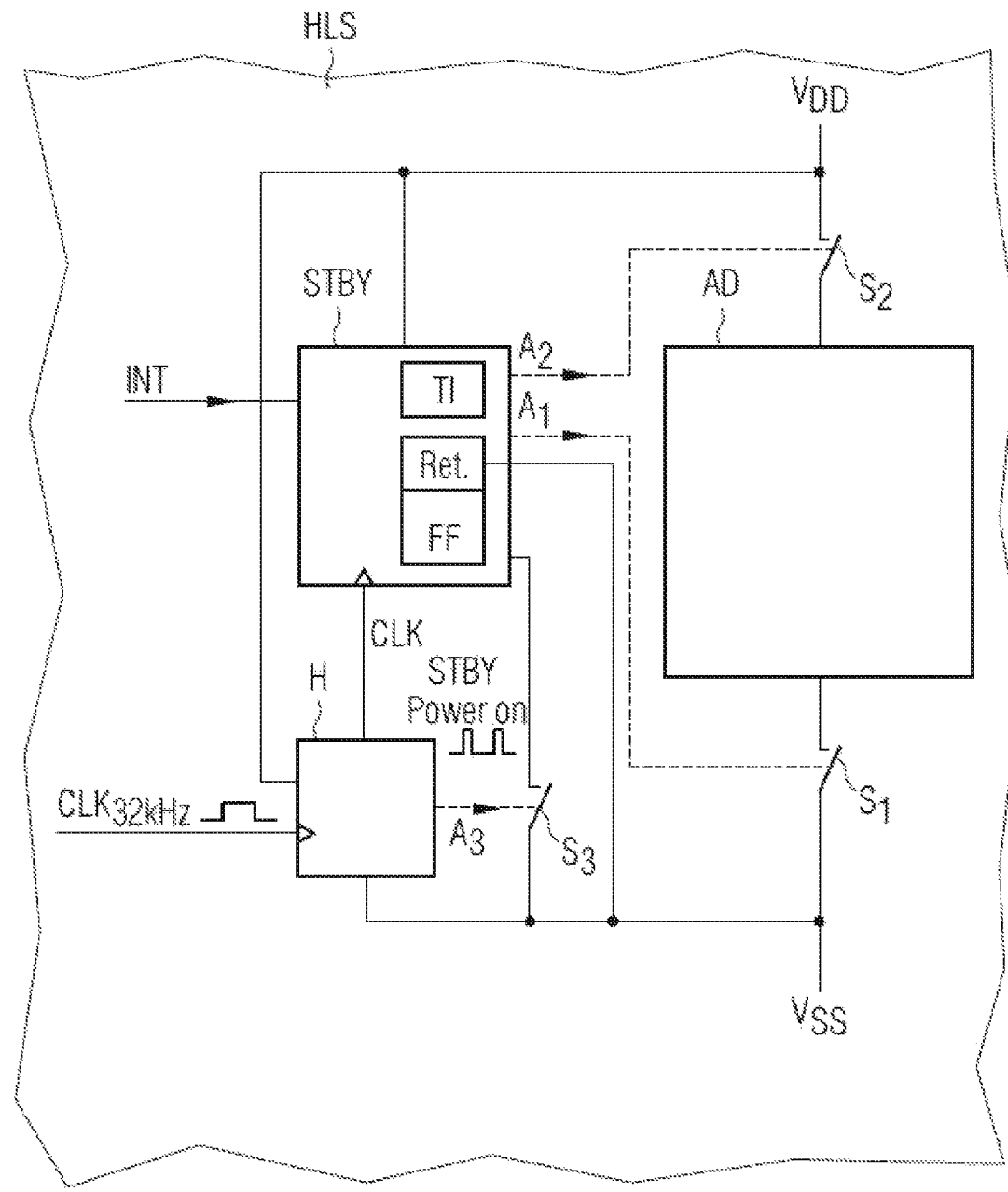
FIG. 18 illustrates a schematic diagram of a circuit arrangement in accordance with a further implementation.

FIG. 18 illustrates a schematic diagram of a circuit arrangement in accordance with a further implementation described herein. An active domain AD realizes the functionality of an integrated semiconductor circuit. The active domain is connected to a first polarity of a supply voltage $V_{ss}$ via a switch $S_1$. The active domain AD is further connected to a second polarity of the supply voltage $V_{DD}$ via a switch $S_2$. A stand-by domain STBY controls the switches $S_1$ and $S_2$ via outputs $A_1$ and $A_2$, respectively. By opening at least one of the switches $S_1$ or $S_2$, the active domain AD gets separated from at least one polarity of the supply voltage $V_{SS}$ or $V_{DD}$ and is thus switched off. The electrical power dissipation of the active domain AD is reduced to zero.

In one implementation, the stand-by domain STBY is permanently connected to the second polarity of the supply voltage $V_{DD}$. Parts of the stand-by domain STBY are permanently connected to the first polarity of the supply voltage $V_{SS}$. This is true e.g. for retention flip-flops Ret that fulfill basic permanent storage functionalities even in the power reduced state. The essential part of the stand-by domain STBY is connected to the first polarity of the supply voltage $V_{SS}$ via a switch $S_3$.

An auxiliary circuit H controls the switch $S_3$ at an output $A_3$ via a power-on signal. By temporarily switching off a part of the stand-by domain STBY, power dissipation caused by leakage currents is reduced in the stand-by domain. In the stand-by mode, a system clock $CLK_{STBY}$ may be required. In one implementation, the system clock may be generated externally and may be applied to the auxiliary circuit H. The auxiliary circuit H may generate the stand-by clock $CLK_{STBY}$ for controlling the stand-by domain STBY. A reactivation of the active domain AD may be performed by applying a signal to the stand-by domain STBY via a hardware interrupt input INT. Alternatively, a wake-up of the stand-by domain STBY may take place via a permanently incremented timer TI.

In a further implementation, a temporary switching-off of essential parts of the stand-by domain may be controlled by the auxiliary circuit H. The auxiliary circuit H may decouple at least one polarity of the supply voltage from the stand-by domain temporarily within the period of a clock cycle (stand-by clock). No functional limitation of the stand-by domain is made by this action as in the modern semiconductor circuit technology edge triggered switching- and storage-elements (edge triggered flip-flops) are used anyway. The points in time that are essential to the stand-by domain are the times where a clock edge of the stand-by clock is applied to the stand-by domain. At these points in time, the stand-by domain may be connected to the regular supply voltage.

Retention flip-lops may contain data that must be permanently kept ready for the reactivation of the semiconductor circuit. The regular supply voltage may be permanently applied to parts of the stand-by domain, e.g. the retention flip-flops. The separation of at least one polarity of the supply voltage from essential parts of the stand-by domain may take place between each rising and each falling edge or each falling edge and each rising edge of the stand-by clock that is applied to the stand-by domain. Thus, during each edge of the stand-by clock the regular supply voltage is applied to the stand-by domain.

For further reduction of the power dissipation, it may be possible to separate at least one polarity of the supply voltage from the stand-by domain within one clock cycle, i.e. between each two rising or each two falling edges of the stand-by clock.

In a further implementation, a partial circuit separates directly at least one polarity of the supply voltage from the active domain within the period of a system clock. In this implementation, a stand-by domain does not need to be provided. The switching-off of the active domain may take please between each rising and each falling edge or between each two rising and each two falling edges, respectively.

Figure 19:
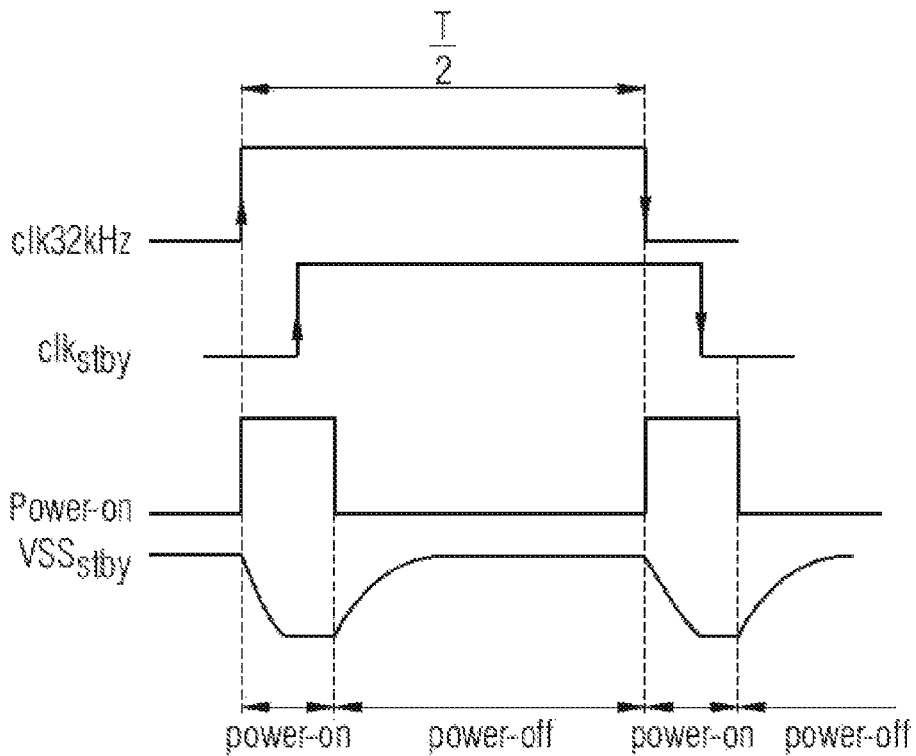
FIG. 19 is an exemplary illustration of signal waveforms for the implementation illustrated and described in connection with FIG. 18.

FIG. 19 is an exemplary illustration of signal waveforms for the implementation illustrated and described in connection with FIG. 18. The clock frequency supplied from external is 32 kHz. Half a system clock T/2 is illustrated in signal $CLK_{32kHz}$. The generated stand-by clock $CLK_{STBY}$ is identical to the signal form of input clock $CLK_{32kHz}$. However, the generated stand-by clock $CLK_{STBY}$ is slightly delayed because of internal signal runtimes. During the rising as well as during the falling edge of $CLK_{STBY}$ the power-on signal gets activated. During times when the power-on signal is switched on, the supply voltage $V_{SS}$ gets switched to the stand-by domain. This can be recognized in the supply voltage $VSS_{STBY}$. During the times when the power-on signal is switched off no supply voltage $V_{SS}$ is applied to the stand-by domain. The deactivation of the power-on signal may be carried out by a gate-delay circuit.

Figure 20:
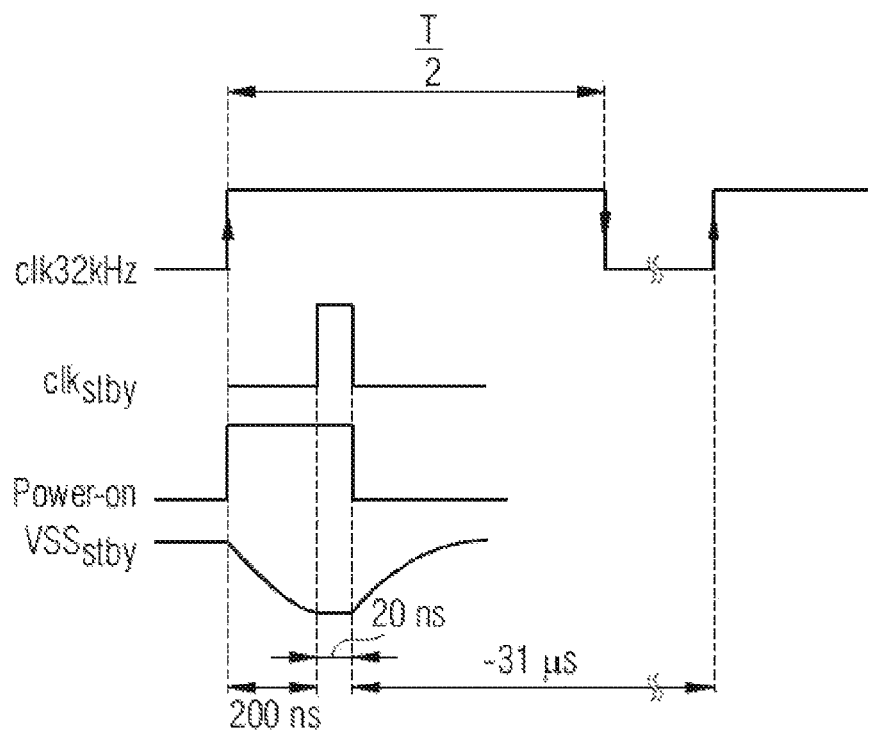
FIG. 20 is a further exemplary illustration of signal waveforms for the implementation illustrated and described in connection with FIG. 18.

FIG. 20 is a further exemplary illustration of signal waveforms for the implementation illustrated and described in connection with FIG. 18. Again, half a clock cycle of signal $CLK_{32kHz}$ is considered. The stand-by clock $CLK_{STBY}$ gets activated only temporarily during the system clock $CLK_{32kHz}$. A supply voltage $VSS_{STBY}$ is applied to the stand-by domain only during the time when the power-on signal is activated. Thus, the stand-by domain is connected to a supply voltage just during a relatively short time of 20 ns. During the predominant period of the system clock T, in the current implementation 31 us, the stand-by domain is without supply voltage. The time duration until the power-on signal is activated, is in the current implementation 200 ns (rise-time).

Figure 21:
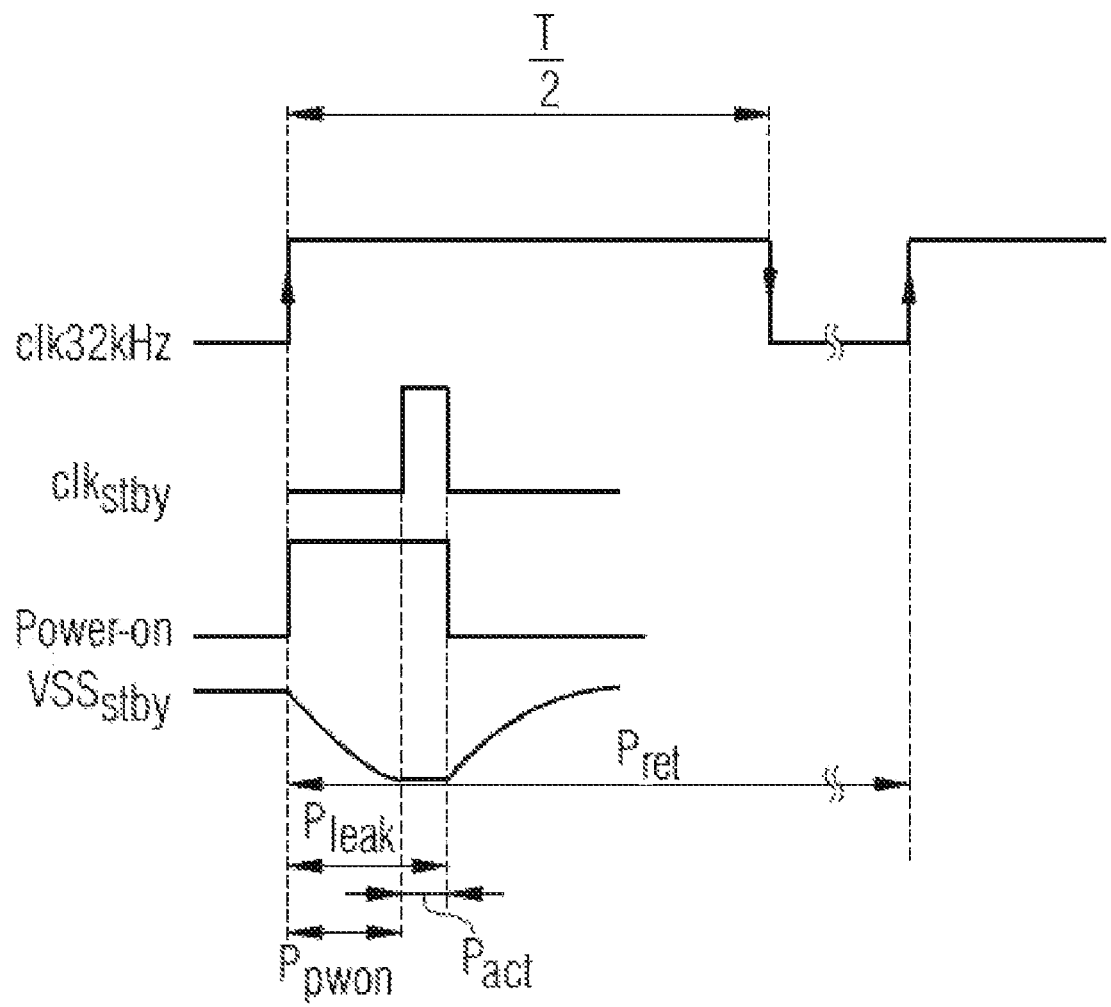
FIG. 21 is a further exemplary illustration of signal waveforms for the implementation illustrated and described in connection with FIG. 18.

FIG. 21 is a further exemplary illustration of signal waveforms for the implementation illustrated and described in connection with FIG. 18. In addition to the implementation illustrated an described in connection with FIG. 20, FIG. 21 specifies the individual shares of the arising electrical power dissipation. The power consumption of the stand-by domain sums up from four individual elements. The first share $P_{ACT}$ specifies the active power consumption that arises during the time when stand-by clock $CLK_{STBY}$ is active. During the time when the stand-by clock is active, this share of the power consumption is identical to the one that appears during a permanent activation of the stand-by domain. A second share of the arising power dissipation $P_{LEAK}$ specifies the leakage current that only occurs when the power-on signal is activated. A third share of the power dissipation $P_{RET}$ specifies the power consumption of retention flip-flops in the stand-by domain. This power may be consumed permanently. A fourth share of the power dissipation $P_{PWON}$ (power-on power)

specifies the share of the power dissipation that is consumed during the switching-on procedure of the stand-by domain STBY.

What is claimed is:

1. Circuit arrangement comprising:
   a first partial circuit to receive a supply voltage;
   a second partial circuit to receive an output signal of the first partial circuit and a first clock signal, the second partial circuit to store the output signal of the first partial circuit depending on the first clock signal; and
   a control unit to decouple the supply voltage from the first partial circuit for a time period that is shorter than a cycle duration of the first clock signal,
   wherein the control unit is configured to receive a second clock signal,
   wherein the first clock signal is a delayed second clock signal, and
   wherein the control unit is configured to couple the supply voltage with the first partial circuit at least between an edge of the second clock signal and the delayed edge of the first clock signal.

2. The circuit arrangement of claim 1, wherein the control unit is configured to decouple the supply voltage from the first partial circuit in each clock cycle for a time period that is shorter than the cycle duration of the first clock signal.

3. The circuit arrangement of claim 1, wherein the control unit is configured to decouple the supply voltage from the first partial circuit at least twice within the period of a clock cycle.

4. The circuit arrangement of claim 1, wherein the first partial circuit comprises combinational logic.

5. The circuit arrangement of claim 1, wherein the second partial circuit comprises a storage element.

6. The circuit arrangement of claim 1, wherein the control unit comprises a switching unit to couple or decouple the supply voltage with or from the first partial circuit.

7. The circuit arrangement of claim 6, wherein the switching unit comprises a transistor.

8. The circuit arrangement of claim 1, wherein the control unit comprises a circuit block, an input of the circuit block to receive the second clock signal, and the circuit block to generate the first clock by delaying the second clock signal.

9. The circuit arrangement of claim 8, wherein the circuit block is configured to generate the first clock signal by changing the duty cycle of the second clock signal.

10. The circuit arrangement of claim 8, wherein the first clock signal and the second clock signal have an identical duty cycle.

11. The circuit arrangement of claim 1, further comprising a configuration unit to set an operating mode, the second partial circuit to receive the first clock signal or the second clock signal depending on the operating mode, and the control unit to decouple the supply voltage from the first partial circuit depending on the operating mode.

12. The circuit arrangement of claim 11, wherein the second partial circuit is configured to receive the first clock signal in a first operating mode and the second clock signal in a second operating mode, and wherein the control unit is configured to couple continuously the supply voltage with the first partial circuit in the second operating mode.

13. The circuit arrangement of claim 1, wherein the supply voltage comprises a first supply voltage line with a first supply voltage potential and a second supply voltage line with a second supply voltage potential, and wherein the control unit is configured to decouple the first supply voltage line and the second supply voltage line from the first partial circuit.

14. The circuit arrangement of claim 1, wherein the first clock signal has an asymmetrical duty cycle.

15. The circuit arrangement of claim 1, wherein the supply voltage comprises a first supply voltage line with a first supply voltage potential and a second supply voltage line with a second supply voltage potential, and wherein the control unit is configured to decouple the first supply voltage line or the second supply voltage line from the first partial circuit.

16. A method of operating a circuit arrangement, comprising:
   providing an output signal of a first partial circuit to a second partial circuit;
   storing the output signal in the second partial circuit depending on a first clock signal;
   decoupling a supply voltage from the first partial circuit for a time period that is shorter than a cycle duration of the first clock signal;
   providing a second clock signal;
   delaying the second clock signal, the delayed second clock signal being the first clock signal; and
   coupling the supply voltage with the first partial circuit at least between an edge of the second clock signal and the delayed edge of the first clock signal.

17. The method of claim 16, further comprising:
   decoupling the supply voltage from the first partial circuit at least twice within the period of a clock cycle.

18. The method of claim 16, further comprising:
   changing the duty cycle of the second clock signal to generate the first clock signal.

19. The method of claim 16, further comprising:
   setting an operating mode; and
   decoupling the supply voltage from the first partial circuit depending on the operating mode.

20. A system comprising:
   a controller,
   a circuit arrangement having a first partial circuit to receive a supply voltage, a second partial circuit to receive an output signal of the first partial circuit and a first clock signal, the second partial circuit to store the output signal of the first partial circuit depending on the first clock signal, and a control unit to decouple the supply voltage from the first partial circuit for a time period that is shorter than a cycle duration of the first clock signal, wherein the control unit is configured to receive a second clock signal, wherein the first clock signal is a delayed second clock signal, wherein the control unit is configured to couple the supply voltage with the first partial circuit at least between an edge of the second clock signal and the delayed edge of the first clock signal; and
   a communication interface in communication with the circuit arrangement to transfer data to the circuit arrangement in accordance with the controller.

21. The system of claim 20, wherein the controller is configured to control the data transfer between the communication interface and the circuit arrangement.

* * * * *